United States Patent
Menges

(10) Patent No.: US 7,458,723 B2
(45) Date of Patent: Dec. 2, 2008

(54) LINEAR GUIDE WITH CAGE CHAIN

(75) Inventor: Martin Menges, Homburg (DE)

(73) Assignee: Schaeffler KG, Herzogenaurach (DE)

( * ) Notice: Subject to any disclaimer, the term of this patent is extended or adjusted under 35 U.S.C. 154(b) by 232 days.

(21) Appl. No.: 11/278,875

(22) Filed: Apr. 6, 2006

(65) Prior Publication Data
US 2006/0228059 A1 Oct. 12, 2006

(30) Foreign Application Priority Data
Apr. 7, 2005 (DE) .................. 10 2005 015 971

(51) Int. Cl.
F16C 29/06 (2006.01)
(52) U.S. Cl. .......................... 384/51; 384/13
(58) Field of Classification Search ............. 384/43–45, 384/51, 13, 470, 520, 523, 572, 573, 576, 384/606, 623
See application file for complete search history.

(56) References Cited

U.S. PATENT DOCUMENTS

| | | | |
|---|---|---|---|
| 2,987,350 A * | 6/1961 | Hay | 384/470 |
| 4,781,877 A * | 11/1988 | Rabe | 29/898.067 |
| 6,113,274 A | 9/2000 | Horimoto | |
| 6,217,217 B1 | 4/2001 | Teramachi | |
| 2002/0049277 A1* | 4/2002 | Yabe et al. | 384/462 |
| 2003/0039414 A1* | 2/2003 | Niwa et al. | 384/51 |
| 2004/0202389 A1* | 10/2004 | Wei et al. | 384/44 |

FOREIGN PATENT DOCUMENTS

| | | |
|---|---|---|
| DE | 10101054 Y | 7/2001 |
| DE | 2004006538 X | 9/2004 |
| GB | 2397628 Y | 5/2001 |
| JP | 2003184986 Y | 12/2001 |
| JP | 2003239982 Y | 2/2002 |

* cited by examiner

Primary Examiner—Thomas R Hannon
(74) Attorney, Agent, or Firm—Lucas & Mercanti, LLP

(57) ABSTRACT

Linear guide having a guide carriage (1) which can be mounted on a guide rail (2) in a rolling manner via rolling elements (3) and is provided with at least one endless rolling-element passage (5) for the rolling elements (3), which rolling-element passage (5) has a supporting passage (6) for supporting rolling elements (3), a return passage (9) for returning rolling elements (3) and two deflecting passages (10) which endlessly connect the supporting passage (6) and the return passage (9) to one another, a cage chain (14) being provided, in the cage pockets (17) of which a respective rolling element (3) is accommodated, the cage chain (14) having cage webs (15, 22, 26, 33), arranged between rolling elements (3) adjacent to one another, and at least one cage strap (16), which extends along the rolling-element passage (5) and connects the cage webs (15, 22, 26, 33) to one another, the rolling elements (3) being arranged in the cage pockets (17) with play in the extension direction of the cage chain (14), the cage webs (15, 22, 26, 33), on their sides facing the cage pockets (17), having lubricant pockets (20, 24, 27, 29, 36) which can be filled with lubricant for the delivery of lubricant to the rolling elements (3).

11 Claims, 3 Drawing Sheets

LINEAR GUIDE WITH CAGE CHAIN

FIELD OF THE INVENTION

Figure 1:
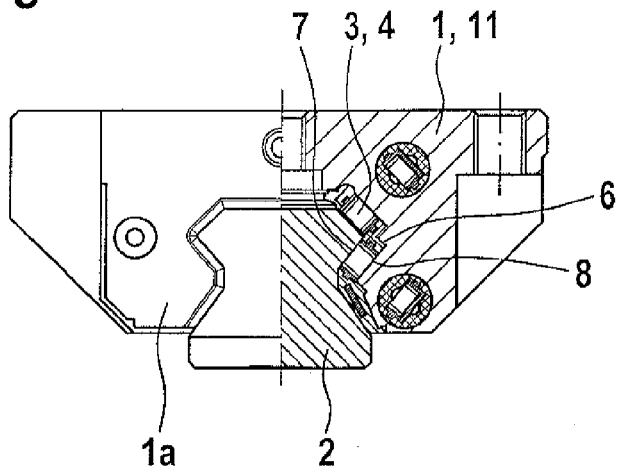

The invention relates to a linear guide having a guide carriage which can be mounted on a guide rail in a rolling manner via rolling elements.

U.S. Pat. No. 6,217,217 B1, for example, has disclosed a linear guide having a guide carriage which can be mounted on a guide rail in a rolling manner via rollers. With its two legs, the roughly U-shaped guide carriage encloses the guide rail. The guide carriage is provided with a plurality of endless roller passages for the rollers, this roller passage having a supporting passage for supporting rollers, a return passage for returning rollers and two deflecting passages which endlessly connect the supporting passage and the return passage to one another. The guide carriage comprises a supporting body and head pieces arranged at both end faces of the supporting body. The supporting body is provided with the return passage and the supporting passage, and the two head pieces are provided with the deflecting passages. Provided in the endless rolling-element passage is a cage chain, in the cage pockets of which a respective roller is accommodated, a respective cage web being arranged between rollers arranged adjacent to one another. Provided on both end faces of the rollers is a respective cage strap which connects the cage webs to one another.

Such linear guides are normally lubricated, so that a lubricating film is formed between the rollers and the raceways. For re-lubrication of the linear guide, a lubricating nipple provided on one of the head pieces is arranged here (FIG. 8), via which lubricating nipple lubricant finally passes into the rolling-element passage.

The object of the present invention is to specify a linear guide according to the features of claim 1 characterized in that the lubrication is improved.

According to the invention, this object is achieved in that the rolling elements are arranged in the cage pockets with play in the extension direction of the cage chain, the cage webs, on their sides facing the cage pockets, having lubricant pockets which can be filled with lubricant for the delivery of lubricant to the rolling elements.

During a complete circulation of the cage chain in the endless rolling-element passage, that part of the cage chain which runs in the supporting passage pulls that part of the cage chain which is located in the return passage. In the region of the supporting passage, the rotating rolling elements are rolled in their running direction. The rolling elements bear in the cage pockets against the front cage webs as viewed in the running direction. In the region of the return passage, a rolling element arranged in the cage pocket bears against the rear cage web as viewed in the running direction. In this way, a slight oscillating movement of the rolling elements between the cage webs of the cage pockets is ensured. This oscillating movement enables the contact between the rolling element and the cage web to be interrupted during a complete circulation, so that lubricant passes out of the lubricant pockets and can be delivered to the rolling elements and finally passes from there to the raceways. The lubricating film between the rolling element and the cage web can be renewed by the oscillating movement of the rolling element at the contact surface of the cage web.

Rolling elements formed in particular from ceramic material are preferred according to the invention. The use of cage chains prevents direct contact between ceramic rolling elements arranged adjacent to one another. With the lubrication provided according to the invention, linear guides according to the invention which are provided in particular with ceramic rolling elements have a very long life with very long maintenance intervals. The rolling elements provided are preferably ceramic rollers.

The guide carriage is preferably formed in a U shape and encloses the guide rail by means of its two legs. Raceways which define the supporting passage and are intended for the rolling elements are arranged on the legs and on the sides of the guide rail which are opposite the legs, it being possible for lubricant to be delivered from the rolling elements to the raceways of both the guide carriage and the guide rail.

The cage webs, on their sides facing the cage pockets, may have concave lateral surfaces which are adapted to the cylindrical surfaces of the rollers and are provided with the lubricant pockets. These lubricant pockets can enclose the rollers in a favourable manner and deliver lubricant to the lateral surface of the rollers.

For an especially favourable distribution of the lubricant, the cage chain may be provided with a lubricant reservoir which is inserted into the lubricant pocket and is preferably made of porous material. The lubricant can be stored in the pores. The distribution of the pores over the surfaces of the lubricant pockets permits a uniform distribution of the lubricant. A lubricant reservoir made of porous material is preferably inserted in each lubricant pocket.

The conical lateral surfaces of the cage webs may be provided with guide surfaces for the rollers.

For the preferred use of rollers as rolling elements, the concave lateral surfaces of the cage webs may be provided with a plurality of grooves which form the lubricant pockets. These grooves may be arranged one behind the other in the direction of rotation of the rollers. Likewise conceivable is an arrangement of the grooves parallel to the rotation axis of the rollers. It is likewise conceivable for the grooves to be arranged like a herringbone pattern, the tip of which lies in the direction of rotation of the rollers. Furthermore, the grooves may be arranged one behind the other along the rotation axis of the rollers and parallel to the concave lateral surface. It has been found that, in the arrangement of grooves described, especially reliable transfer of lubricant to the rollers is ensured.

Figure 2:
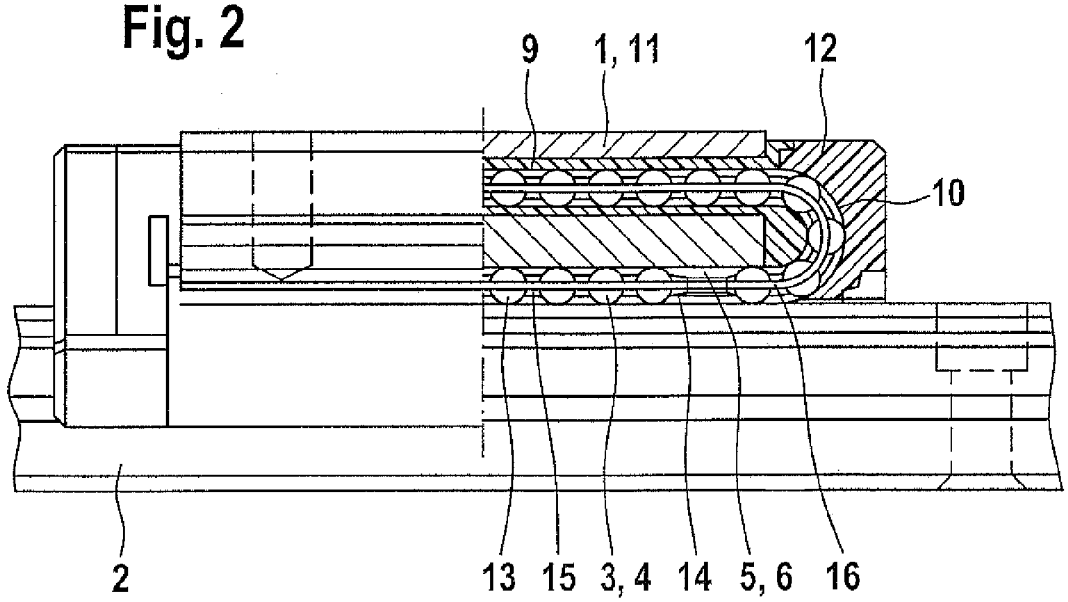
Figure 3:
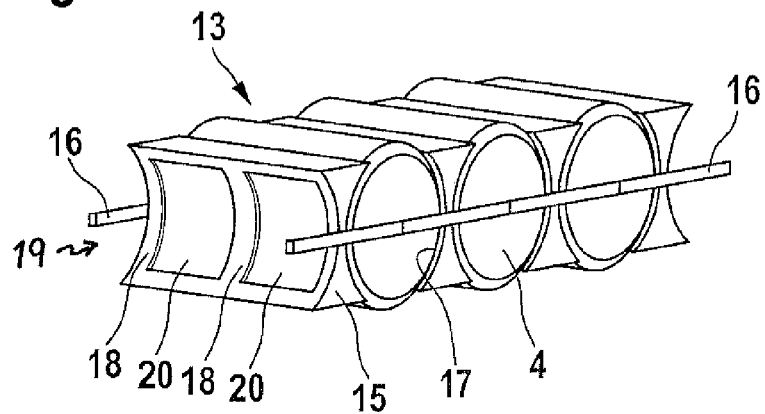
Figure 4:
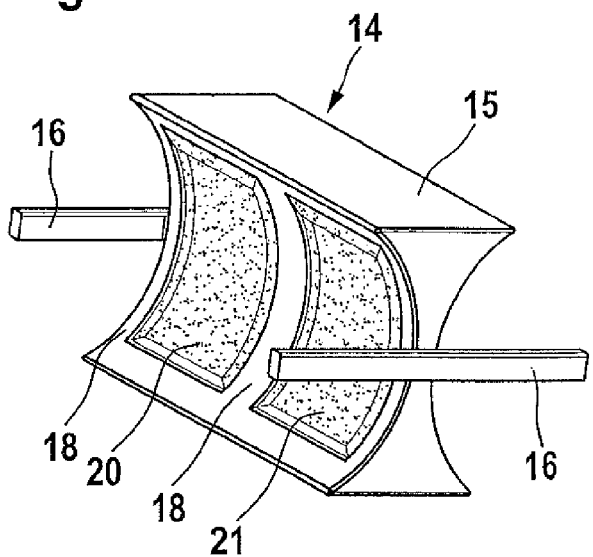

The invention is explained in more detail below with reference to six exemplary embodiments depicted in a total of eight figures. In the drawing:

FIG. 1 shows a cross section through a linear guide according to the invention, FIG. 2 shows a longitudinal section through a linear guide according to the invention, FIG. 3 shows part of a cage chain, provided with rollers, of a linear guide according to FIGS. 1 and 2, FIG. 4 shows part of the linear chain from FIG. 3 in a perspective illustration, FIGS. 5 to 8 show details of modified cage chains in perspective illustration.

DETAILED DESCRIPTION OF THE INVENTION

FIGS. 1 and 2 show a linear guide according to the invention. A guide carriage 1 is mounted on a guide rail 2 in a longitudinally displaceable manner via rolling elements 3. The rolling elements 3 are formed by rollers 4 of ceramic material. It can be seen from FIG. 2 that an endless rolling-element passage 5 is provided characterized in that the rollers 4 can circulate endlessly. The rolling-element passage 5 comprises a supporting passage 6 for supporting rollers 4. As can be seen from FIG. 1, the supporting passage 6 is defined by raceways 7, 8 provided on the guide rail 2 and on the guide carriage 1. Furthermore, the rolling-element passage 5 comprises a return passage 9 characterized in that the rollers 4 run unloaded. Furthermore, the rolling-element passage 5 comprises two deflecting passages 10, of which one is depicted in FIG. 2. The two deflecting passages 10 connect the return passage 9 to the supporting passage 6 to form the endless rolling-element passage 5. It can be seen from FIG. 1 that the guide carriage 1 encloses the guide rail 2 by means of two legs 1a.

The guide carriage 1 comprises a supporting body 11, on which the raceways 8 are formed. Furthermore, the guide carriage 1 comprises two head pieces 12, which are provided with the deflecting passages 10.

A roller chain 13 circulates endlessly in the endless rolling-element passage 5. The roller chain 13 is formed from a cage chain 14, which is preferably produced from plastic by injection moulding. The cage chain 14 comprises cage webs 15, arranged between rollers 4 adjacent to one another, and two cage straps 16, which are arranged on both end faces of the rollers 4 and connect the cage webs to one another. The cage chain 14 is preferably produced in one piece from plastic by injection moulding.

FIG. 3 shows part of the roller chain 13 in a perspective illustration. It can be seen from FIG. 3 that the rollers 4 are arranged in cage pockets 17 of the cage chain 14. On their sides facing the cage pockets 17, the cage webs 15 have concave lateral surfaces 19, so that they are adapted to the cylindrical surface of the rollers 4. Lubricant pockets 20 filled with lubricant are formed on these sides. Also formed on these concave lateral surfaces 19 are concavely shaped guide surfaces 18, which are adapted to the cylindrical surface of the rollers 4.

The present linear guide according to the invention is designed in four rows in a known manner, so that a total of four endless rolling-element passages are provided.

The rollers 4 are provided in the cage pockets 17 with little play in the extension direction of the roller chain. Once the rolling-element chain 13 circulates, the rollers 4 in the return passage 9 abut against the rear cage web 15, in the running direction, of a cage pocket 17. On the other hand, the rollers 4 in the supporting passage 6 abut against the front cage web 15 of the cage pocket 17. This means that, during a complete circulation, the rollers 4 bear alternately against the rear cage web 15 and against the front cage web 15 of a cage pocket 17. This effect is due to the fact that the rollers in the supporting passage are set in rotation and roll on the raceways 7, 8 when the guide carriage 1 is moving. The cage chain 14 is carried along by this linear movement. On the other hand, a change takes place in the return passage 9 to the effect that the cage chain 14 now carries along the rollers 4. The play, provided in the extension direction, of the rollers 4 in the cage pockets 17 is set when the roller chain 13 is fitted in the rolling-element passage 5.

The lubricant present in the cage pockets 17 is delivered to the rollers 4 and passes from the rollers 4 to the raceways 7, 8, so that satisfactory lubrication of the linear guide is ensured.

If, as already explained further above, the rollers 4 are arranged with little play in the cage pockets 17, an especially favourable lubricating effect can be achieved by the interplay of the pocket play with the lubricant pockets 20 arranged on the cage webs 15. The lubricant is delivered from the lubricant pockets 20 to the rollers 4 more effectively by the oscillating movement described of the rollers 4 in the cage pockets 17. This is because the rollers 4 are not in constant sliding contact with the concave lateral surfaces 19, so that lubricant always also passes from the lubricant pocket 20 to the concave guide surface 18 of the cage web 15 when the roller 4 is at a distance from the concave lateral surface 19. When the roller 4 again comes into contact with the concave lateral surface 19 of the cage web 15, lubricant can therefore be delivered to the roller 4 over the complete axial extent of the roller 4. In addition, a lubricating film is built up between the guide surface 18 and the roller 4. A suction effect can occur during the lifting of the roller 4 from the concave lateral surface 19, so that lubricant passes out of the lubricant pocket 20.

FIG. 4 shows a section of the cage chain 14, with the cage web 15 and the two cage straps 16. The guide surfaces 18 for the rollers 4 and the lubricant pockets 20 can also be clearly seen. In contrast to the exemplary embodiment according to FIG. 3, a lubricant reservoir 21 of porous material is additionally inserted into these lubricant pockets 20 in the exemplary embodiment according to FIG. 4. On account of its porous structure, the lubricant reservoir 21 can hold the lubricant in a favourable manner and can keep it evenly distributed over the concave extent. The delivery of lubricant from the lubricant pockets 20 to the rollers 4 is therefore ensured over a large circumference.

Figure 5:
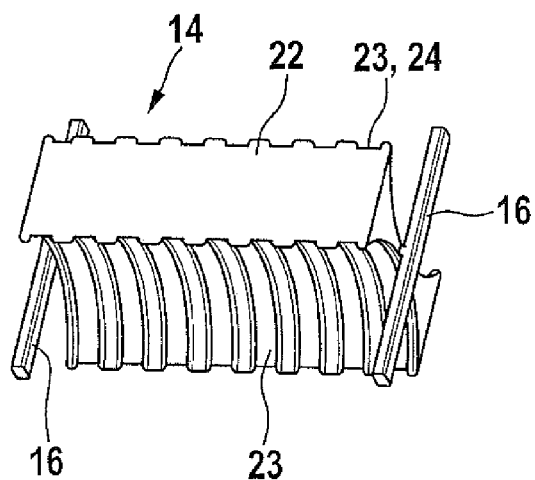

Depending on the application, it may be expedient to provide modified lubricant pockets. FIG. 5 shows, for example, the cage chain 14 with modified cage web 22. This cage web 22 is likewise concavely shaped on its sides facing the cage pockets 17 and is adapted to the cylindrical surface of the rollers 4. In this exemplary embodiment, the cage web 22, on its sides facing the cage pockets 17, is provided with a multiplicity of grooves 23 which form the lubricant pockets 24. These grooves 23 are arranged one behind the other along the rotation axis of the rollers 4 and extend parallel to the cylindrical surface of the rollers 4.

Figure 6:
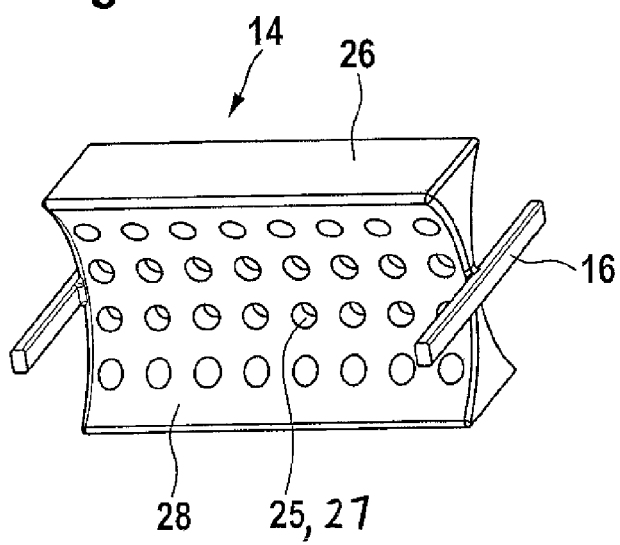

According to FIG. 6, a multiplicity of through-holes 25 which form lubricant pockets 27 may also be provided instead of the grooves. Outside the through-holes 25, the concavely shaped lateral surfaces of these cage webs 26 form a guide surface 28 for the rollers 4.

Figure 7:
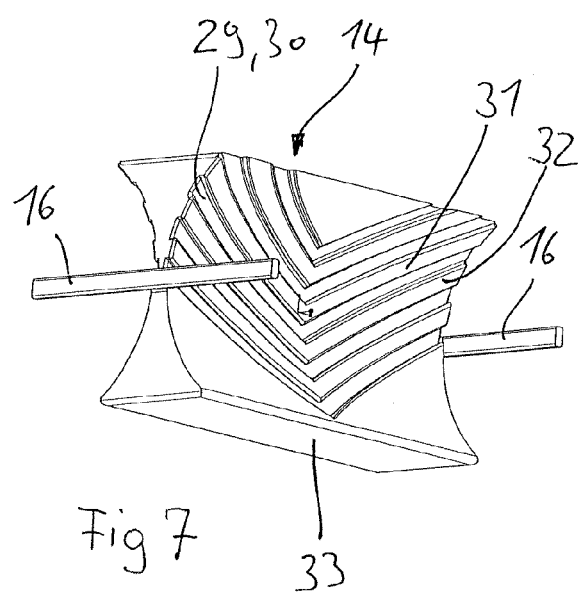

According to FIG. 7, lubricant pockets 29 are formed by grooves 30 which are arranged like a herringbone pattern 31. Guide surfaces 32 for the rollers 4 are formed on the cage web 33 between two grooves 30 adjacent to one another.

Figure 8:
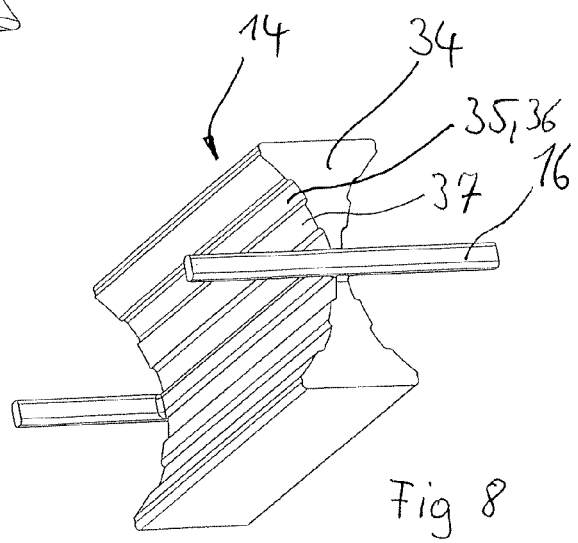

In the exemplary embodiment according to FIG. 8, a cage web 34 is provided characterized in that a multiplicity of grooves 35 form lubricant pockets 36, these grooves 35 being arranged parallel to the rotation axis of the rollers 4, and a multiplicity of grooves 35 being arranged one behind the other along the concavely shaped lateral surface 37 of the cage web 34.

In all the exemplary embodiments, the rollers 4 are formed from ceramic material. Linear guides according to the invention which are provided with ceramic rollers are especially suitable for applications characterized in that long maintenance intervals are demanded.

LIST OF DESIGNATIONS

1 Guide carriage
2 Guide rail
3 Rolling element
4 Roller
5 Rolling-element passage
6 Supporting passage
7 Raceway
8 Raceway
9 Return passage
10 Deflecting passage
11 Supporting body
12 Head piece 13 Roller chain
14 Cage chain
15 Cage web
16 Cage strap
17 Cage pocket
18 Concave guide surface
19 Concave lateral surface
20 Lubricant pocket
21 Lubricant reservoir
22 Cage web
23 Groove
24 Lubricant pocket
25 Through-hole
26 Cage web
27 Lubricant pocket
28 Guide surface
29 Lubricant pocket
30 Groove
31 Herringbone pattern
32 Guide surface
33 Cage web
34 Cage web
35 Groove
36 Lubricant pocket
37 Lateral surface

The invention claimed is:

1. Linear guide comprising:
   a guide carriage mounted on a guide rail in a rolling manner via rolling elements;
   at least one endless rolling-element passage for the rolling elements, the rolling-element passage having a supporting passage for supporting rolling elements, a return passage for returning rolling elements and two deflecting passages which endlessly connect the supporting passage and the return passage to one another;
   a cage chain movable in the endless rolling-element passage, the cage chain having cage webs which are spaced apart and at least one cage strap which extends along the rolling-element passage and connects the cage webs to one another, the space between each of the cage webs delimiting a cage pocket, one of each roller elements arranged in each cage pocket, the rolling elements arranged in each cage pocket with play in the extension direction of the cage chain such that an oscillating movement is created between the cage webs and the rolling elements;
   the cage webs each having on their sides facing the cage pocket, a lubricant pocket for the delivery of lubricant to the rolling elements.

2. Linear guide according to claim 1, wherein the guide carriage is roughly U shaped and has two legs which enclose the guide rail, raceways define the supporting passage for the rolling elements, one of the raceways arranged on one of the legs and the other of raceways arranged on a side of the guide rail which is opposite the one of the legs, lubricant being delivered from the rolling elements to the raceways.

3. Linear guide according to claim 1, wherein the cage chain a lubricant reservoir made of porous material inserted into the lubricating pocket of at least one of the cage webs.

4. Linear guide according to claim 3, wherein the lubricant reservoir made of porous material is inserted in each lubricant pocket of each of the cage webs.

5. Linear guide according to claim 1, wherein the rolling elements are rollers formed from ceramic material.

6. Linear guide according to claim 5, wherein the cage webs, on their sides facing the cage pockets, have concave lateral surfaces which are adapted to the cylindrical surfaces of the rollers and are provided with the lubricant pockets.

7. Linear guide according to claim 6, wherein the concave lateral surfaces have guide surfaces for the rollers.

8. Linear guide according to claim 6, wherein the concave lateral surfaces are each provided with a plurality of grooves which form the lubricant pockets.

9. Linear guide according to claim 8, wherein the grooves are arranged one behind the other in the direction of rotation of the rollers.

10. Linear guide according to claim 8, wherein the grooves are arranged parallel to the rotation axis of the rollers.

11. Linear guide according to claim 8, wherein the grooves are arranged like a herringbone pattern, the tip of which lies in the direction of rotation of the rollers.

* * * * *